United States Patent [19]

White et al.

[11] Patent Number: 6,069,890
[45] Date of Patent: May 30, 2000

[54] INTERNET TELEPHONE SERVICE

[75] Inventors: Patrick E. White, Vienna; Robert D. Farris, Sterling, both of Va.

[73] Assignee: Bell Atlantic Network Services, Inc., Arlington, Va.

[21] Appl. No.: 08/670,908

[22] Filed: Jun. 26, 1996

[51] Int. Cl.[7] .............................. H04L 12/28; H04M 1/62; H04M 11/00
[52] U.S. Cl. ........................... 370/352; 370/389; 370/401; 370/427; 379/88.17; 379/90.01; 379/93.01
[58] Field of Search .................................... 370/352, 353, 370/380, 389, 392, 396, 401, 404, 427, 435, 450, 465, 485; 379/90.01, 93.01, 93.05, 93.09, 100.15, 100.16, 88.17

[56] References Cited

U.S. PATENT DOCUMENTS

| | | | |
|---|---|---|---|
| 4,652,700 | 3/1987 | Matthews et al. | 379/89 |
| 4,771,425 | 9/1988 | Baran et al. | 370/85 |
| 4,872,160 | 10/1989 | Hemmady et al. | 345/501 |
| 4,958,341 | 9/1990 | Hemmady et al. | 370/352 |
| 5,008,926 | 4/1991 | Misholi | 379/89 |
| 5,012,511 | 4/1991 | Hanle et al. | 379/21.1 |
| 5,029,199 | 7/1991 | Jones et al. | 379/89 |
| 5,193,110 | 3/1993 | Jones et al. | 379/93.14 |
| 5,341,374 | 8/1994 | Lewen et al. | 370/450 |
| 5,375,068 | 12/1994 | Palmer et al. | 395/200.34 |
| 5,410,754 | 4/1995 | Koltzbach et al. | 370/261 |
| 5,434,913 | 7/1995 | Tung et al. | 379/202 |
| 5,490,247 | 2/1996 | Tung et al. | 379/202 |
| 5,493,568 | 2/1996 | Sampat et al. | 370/353 |
| 5,526,353 | 6/1996 | Henley et al. | 370/60.1 |
| 5,572,583 | 11/1996 | Wheeler, Jr. et al. | 379/207 |
| 5,583,920 | 12/1996 | Wheeler, Jr. | 379/88 |
| 5,608,446 | 3/1997 | Carr et al. | 348/6 |
| 5,608,706 | 3/1997 | Gordon | 379/100 |
| 5,610,910 | 3/1997 | Focsaneanu et al. | 370/351 |
| 5,712,903 | 1/1998 | Bartholomew et al. | 379/89 |
| 5,724,355 | 3/1998 | Bruno et al. | 370/401 |
| 5,726,984 | 3/1998 | Kubler et al. | 370/349 |
| 5,742,670 | 4/1998 | Bennett | 379/142 |
| 5,790,548 | 8/1998 | Sistanizadeh et al. | 370/401 |
| 5,793,762 | 8/1998 | Penners et al. | 370/389 |
| 5,838,682 | 11/1998 | Dekelbaum et al. | 370/401 |

FOREIGN PATENT DOCUMENTS

WO 97/20424   6/1997   WIPO .

*Primary Examiner*—Krista Zele
*Assistant Examiner*—Allan Hoosain
*Attorney, Agent, or Firm*—McDermott, Will & Emery

[57] ABSTRACT

A system and method for providing telephone type services over the internetwork commonly known as the Internet. Public switched telephone networks utilizing program controlled switching systems are arranged in an architecture with the Internet to provide a methodology for facilitating telephone use of the Internet by customers on an impromptu basis. Provision is made to permit a caller to set-up and carry out a telephone call over the Internet from telephone station to telephone station without access to computer equipment, without the necessity of maintaining a subscription to any Internet service, and without the requiring Internet literacy or knowledge. Calls may be made on an inter or intra LATA, region or state, nationwide or worldwide basis. Billing may be implemented on a per call, timed, time and distance or other basis. Usage may be made of common channel interoffice signaling to set up the call and establish the necessary Internet connections and addressing. Calls may be made from telephone station to telephone station, from telephone station to computer or computer to telephone station.

7 Claims, 9 Drawing Sheets

INTERNET TELEPHONE SERVICE

RELATED APPLICATIONS

This application is related to application Ser. No. 08/698,713, filed Aug. 16, 1996, Internet Telephone Service, which is a continuation-in-part of application Ser. No. 08/634,543, filed Apr. 18, 1996, Internet Telephone Service. Application Ser. No. 08/634,543 is incorporated herein in their entirety. This application is also related to application Ser. No. 08/598,767, filed Feb. 9, 1996, Analog Terminal Internet Access, and Ser. No. 08/598,769, filed Feb. 9, 1996, Analog Terminal Internet Access.

TECHNICAL FIELD

The present invention relates to methods and system structures for providing public and private telephone service over the Internet and more particularly relates to providing such services through the public telecommunications system including over existing copper telephone lines.

BACKGROUND

Attention recently has been directed to implementing voice telephone service over the worldwide network now commonly known as the Internet. The Internet had its genesis in U.S. Government (called ARPA) funded research which made possible national internetworked communication systems. This work resulted in the development of network standards as well as a set of conventions for interconnecting networks and routing information. These protocols are commonly referred to as TCP/IP. The protocols generally referred to as TCP/IP were originally developed for use only through Arpanet and have subsequently become widely used in the industry. TCP/IP is flexible and robust, in effect, TCP takes care of the integrity and IP moves the data. Internet provides two broad types of services: connectionless packet delivery service and reliable stream transport service. The Internet basically comprises several large computer networks joined together over high-speed data links ranging from ISDN to T1, T3, FDDI, SONET, SMDS, OT1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries. It is presently estimated that the growth of the Internet is at a more or less annual doubling rate.

Referring to FIG. 1 there is shown a simplified diagram of the Internet. Generally speaking the Internet consists of Autonomous Systems (AS) which may be owned and operated by Internet Service Providers (ISPs) such as PSI, UUNET, MCI, SPRINT, etc. Three such AS/ISPs are shown in FIG. 1 at 10, 12 and 14. The Autonomous Systems (ASs) are linked by Inter-AS Connections 11, 13 and 15. Information Providers (IPs) 16 and 18, such as America Online (AOL) and Compuserve, are connected to the Internet via high speed lines 20 and 22, such as T1/T3 and the like. Information Providers generally do not have their own Internet based Autonomous Systems but have or use Dial-Up Networks such as SprintNet (X.25), DATAPAC and TYMNET.

By way of current illustration MCI is both an ISP and an IP, Sprint is an ISP, and MicroSoft (MSN) is an IP using UUNET as an ISP. Other information providers, such as universities, are indicated in exemplary fashion at 24 and are connected to the AS/ISPs via the same type connections here illustrated as T1 lines 26. Corporate Local Area Networks (LANs), such as those illustrated in 28 and 30, are connected through routers 32 and 34 and links shown as T1 lines 36 and 38. Laptop computers 40 and 42 are representative of computers connected to the Internet via the public switched telephone network (PSTN) are shown connected to the AS/ISPs via dial up links 44 and 46.

The Information Providers (IPs) constitute the end systems which collect and market the information through their own servers. Access providers are companies such as UUNET, PSI, MCI and SPRINT which transport the information. Such companies market the usage of their networks.

In simplified fashion the Internet may be viewed as a series of routers connected together with computers connected to the routers. In the addressing scheme of the Internet an address comprises four numbers separated by dots. An example would be 164.109.211.237. Each machine on the Internet has a unique number which constitutes one of these four numbers. In the address the leftmost number is the highest number. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This continues until the packet arrives at the destination computer. The separate packets that constitute a message may not travel the same path depending on traffic load. However they all reach the same destination and are assembled in their original order in a connectionless fashion. This is in contrast to connection oriented modes such as frame relay and ATM or voice.

One or more companies have recently developed software for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers.

The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

Palmer et al. U.S. Pat. No. 5,375,068, issued Dec. 20, 1994 for Video Teleconferencing for Networked Workstations discloses a video teleconferencing system for networked workstations. A master process executing on a local processor formats and transmits digital packetized voice and video data, over a digital network using TCP/IP protocol, to remote terminals.

Lewen et al. U.S. Pat. No. 5,341,374, issued Aug. 23, 1994 for Communication Network Integrating Voice Data and Video with Distributed Call Processing, discloses a local area network with distributed call processing for voice, data and video. Real-time voice packets are transmitted over the network, for example to and from a PBX or central office.

Hemmady et al. U.S. Pat. No. 4,958,341, issued Sep. 18, 1990 for Integrated Packetized Voice and Data Switching System, discloses an integrated packetized voice and data switching system for a metropolitan area network (MAN). Voice signals are converted into packets and transmitted on the network. Tung et al. U.S. Pat. No. 5,434,913, issued Jul. 18, 1995, and U.S. Pat. No. 5,490,247, issued Feb. 6, 1996, for Video Subsystem for Computer Based Conferencing System, disclose an audio subsystem for computer-based conferencing. The system involves local audio compression and transmission of information over an ISDN network.

Hemmady et al. U.S. Pat. No. 4,872,160, issued Oct. 3, 1989, for Integrated Packetized Voice and Data Switching System, discloses an integrated packetized voice and data switching system for metropolitan area networks.

Sampat et al. U.S. Pat. No. 5,493,568, issued Feb. 20, 1996, for Media Dependent Module Interface for Computer Based Conferencing System, discloses a media dependent module interface for computer based conferencing system. An interface connects the upper-level data link manager with the communications driver.

Koltzbach et al. U.S. Pat. No. 5,410,754, issued Apr. 25, 1995, for Bi-Directional Wire Line to Local Area Network Interface and Method, discloses a bi-directional wire-line to local area network interface. The system incorporates means for packet switching and for using the internet protocol (IP).

DISCLOSURE OF THE INVENTION

OBJECTS OF THE INVENTION

It is an object of the present invention to provide telephone service via the Internet to users of the public telecommunications network either with or without access to a computer and with or without separate telephone user access to the Internet.

It is another object of the invention to provide the general public with an economical and convenient telephone service via the Internet without requiring the possession of computing equipment or familiarity with the Internet or its methodology on the part of the user.

It is yet another object of the invention to provide the public with impulse access to the Internet for voice communications without requiring maintenance of a subscription to an Internet access service.

It is another object of the invention to provide the foregoing types of telephone service over the Internet via the public telephone network without the necessity of reliance on signaling systems of interexchange carriers.

It is yet another object of the invention to provide voice service over public telephone systems via the Internet where the use of the Internet is optional to the Telco and transparent to the customer.

It is another object of the invention to provide voice service over public telephone systems via the Internet from telephone to telephone, from telephone to computer, from computer to telephone, and from computer to computer.

It is still another object of the invention to provide the foregoing type services with billing capabilities based substantially on equipment and methodologies presently available in the public switched telephone network.

SUMMARY OF THE INVENTION

The invention constitutes a system and method for providing telephone type services over the internetwork commonly known as the Internet. Public switched telephone networks utilizing program controlled switching systems are arranged in an architecture with the Internet to provide a methodology for facilitating telephone use of the Internet by customers on an impromptu basis. Provision is made to permit a caller to set-up and carry out a telephone call over the Internet from telephone station to telephone station without access to computer equipment, without the necessity of maintaining a subscription to any Internet service, and without the requiring Internet literacy or knowledge. Calls may be made on an inter or intra LATA, region or state, nationwide or worldwide basis. Billing may be implemented on a per call, timed, time and distance or other basis. Usage may be made of common channel interoffice signaling to set up the call and establish the necessary Internet connections and addressing. Calls may be made from telephone station to telephone station, from telephone station to computer or computer to telephone station.

DESCRIPTION OF THE DRAWINGS

Referring to FIG. 2 there is shown a simplified block diagram of an Advanced Intelligent Network (AIN) controlled Public Switched Telephone Network (PSTN) arranged in an architecture for implementing one proposed system for providing telephone services via the Internet. This system is explained in detail in the above referenced related application Ser. No. 08/934,543, which application is assigned to the assignee of the present application. While that system provides an elegant arrangement for providing such telephone service over the Internet it is believed that the instant invention provides an alternate system with advantages in the streamlining of the methodology and elimination of a need for extensive use of a common channel signaling network for implementation over long distances. The system of FIGS. 2 and 3 is here explained as background to understanding of the system and advantages of the present invention.

Referring to FIG. 2 there are shown two SSP capable central offices 50 and 52 which may be located in the same or different states and regions. These central offices are connected by trunks indicated at 54 and 55 to the PSTN indicated by a cloud 57. Each central office is connected by local loops to subscribers customer premises equipment (CPE) such as telephone terminals 56 and 58. These may be basic instruments for providing Plain Old Telephone Service (POTS). The subscriber premises are also shown as having personal computers (PCs) 60 and 62 connected to the local loops via modems 64 and 66. The SSPs associated with the central offices 50 and 52 are connected by CCIS links to an STP which in turn may be connected to an ISCP. While the STP functionality is here shown as constituting a single STP it will be appreciated that this is for the purpose of simplicity only and that a hierarchy of STPs may be involved.

The central offices 50 and 52 are provided with an Internet Module indicated at 72 and 74 connected by T1 trunks 76 and 78. Alternatively the Internet Module hardware may be situated at the central office and associated with the switching system. The Internet Modules may be provided with SSP capabilities and connected into the CCIS network as indicated by the links to the illustrative STP 80. The SSPs serving the Internet Module are inter-connected with the central office SSPs and CCIS network as shown here by illustrative links 79 and 81. The Internet Modules may be linked for signaling purposes by conventional F links indicated at 82. The Internet Modules are connected to the Internet cloud by T1/T3 trunks 86 and 88.

Figure 1:
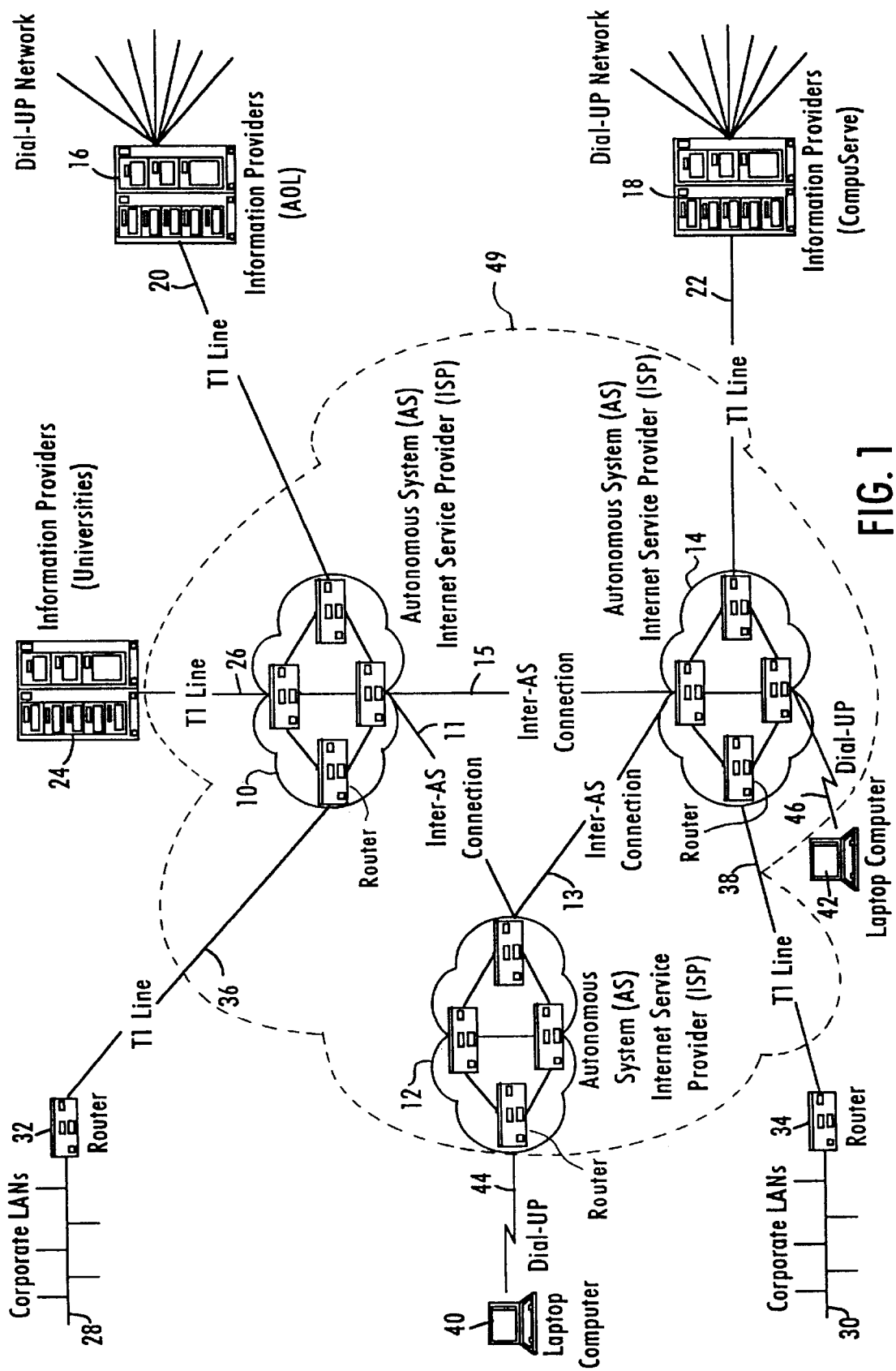
FIG. 1 is a simplified diagram of the Internet.
Figure 2:
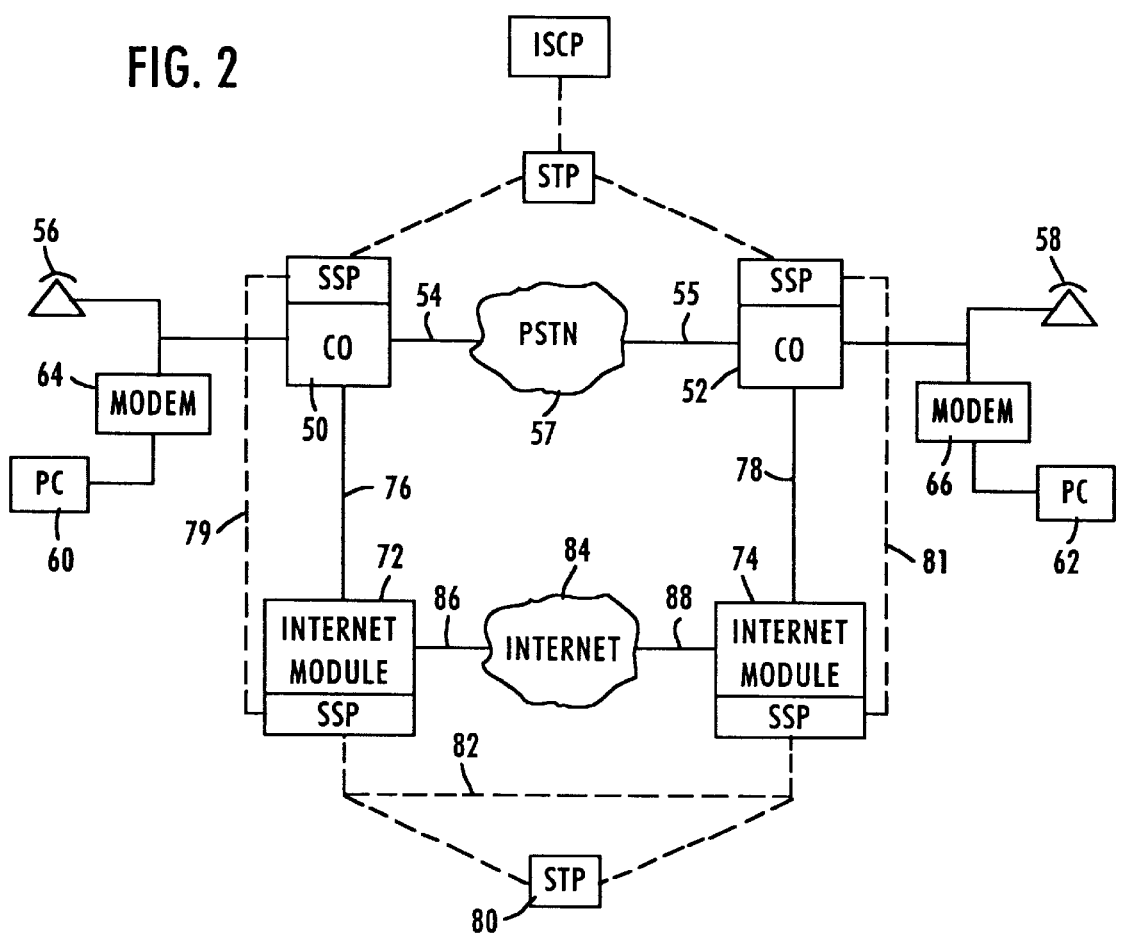
FIG. 2 shows the functional architecture of one proposal for providing an advanced form of telephone service via public switched telephone networks and the Internet using common channel interoffice signaling (CCIS) for establishing the telephone link.
Figure 3:
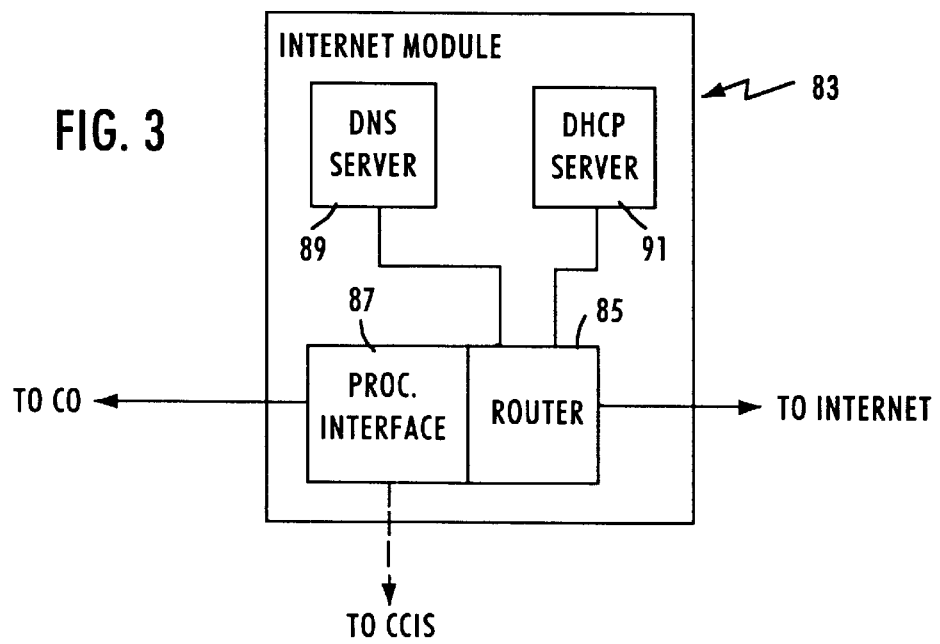
FIG. 3 shows in diagrammatic form the functional architecture of one embodiment of an Internet Module for use in the system illustrated in FIG. 2.

The functional architecture of one embodiment of an Internet Module for use in this system is shown diagrammatically in FIG. 3. The Internet Module, generally indicated at 83, includes a router 85 of the type now generally used in Internet practice, such as shown in FIG. 1. For performing some functions which may be utilized in the system of FIG. 2 the router may be provided with an interface with processing capability as illustratively shown at 87. Connected to the router are a Domain Name Service (DNS) server 89 and a Dynamic Host Configuration Protocol (DHCP) server 91 of the type conventionally used by Internet Service Providers in existing Internet Service. The router interface is connected to the central office and to the CCIS network while the router is connected to the Internet.

In the operation of the system of FIG. 2 an Internet connection is used to link a calling to a called telephone without the necessity of either party possessing or using personal or office computer equipment. The subscriber in this example uses the POTS station at 56 to initiate an Internet call to a called party at the POTS station 58. The caller goes off-hook and dials *82. This prefix has been established by the Telco offering the service as a predesignated prefix with which the public may initiate an Internet telephone call. The dialing of the prefix *82 is followed by the dialing of the directory number of the called party at the station 58.

The central office switching system responds to the off-hook and receives the dialed digits from the calling station. The central office switching system analyzes the received digits and determines from the prefix *82 that the call is an Internet call. Responsive to its programming it knows that the call must be completed through a remote central office and that further processing is necessary. The local or originating central office suspends the call and sends a CCIS query message through one or more of the STPs.

The query message goes to the central office to which the called station is connected. The receiving or destination central office receives the query and determines whether or not the called station at 58 is busy. If the called station is busy, the receiving central office so informs the originating central office. The originating central office provides a busy signal to the calling station.

If the called station is not busy, the receiving central office busies out the called station line by blocking all calls. The receiving or destination central office then informs the originating central office that the called line is available and waiting and that the processor in the Internet Module associated with the central office 52 is available.

An Internet virtual connection is then established between the calling and called stations. The receiving or destination central office provides a ringing signal to the called station and the originating central office sends ringback tone back through the local loop to the calling station. When the called station goes off-hook and the Internet virtual connection is completed the conversation via the Internet can commence.

The set up of the Internet connection is as follows. When the originating central office receives from the destination central office the CCIS signal announcing that the called station is available and waiting, the originating central office may send a CCIS message to the Internet Module 72 and the processor interface 87 to the router 85. This message delivers the directory numbers of the calling station and the called station and requests establishment of an Internet connection (or virtual connection) between the two.

The processor interface and router may then react to receipt of that CCIS signal and request the temporary assignment of Internet addresses for the processors associated with the respective central offices. Upon completion of the assignment of the addresses the processor 87 may send a CCIS signal to the originating central office advising of that fact. When the originating central office receives the message that the addresses have been assigned the switching system connects the originating local loop to the Internet Module 72.

As an alternative to this connection procedure the originating central office may establish the line or trunk connection to the Internet Module 72 immediately upon receipt of the CCIS signal indicating that the called station is available and waiting. In this alternative the originating central office then sends the directory numbers of the calling and called stations along with a request to establish an Internet connection or virtual connection between the two stations for a voice communication session either via the line or trunk connection to the Internet Module 72 or via the CCIS link to the Internet Module.

Following either of the foregoing procedures, the Internet Module router 85 in the Internet Module 72 sends a request for the assignment of temporary IP addresses for the two directory numbers to the DHCP server 91. The DHCP server hears the message and offers an IP address for each directory number for a certain time period which may be determined by the router or the server. The router may request a specified time period and the DHCP server may decline and offer a longer or shorter period, seeking mutual agreement. Upon agreement the addresses are accepted and assigned. The originating Internet Module 72 next triggers a CCIS message to the destination Internet Module 74 which includes the temporary IP address assigned to the called directory number and associated processor.

As an alternative to the obtaining of an Internet address for the processor associated with the receiving central office at the originating central office switching system and its associated Internet Module the address may be obtained at the receiving central office switching system and its associated Internet Module and communicated to the originating central office switching system via the common channel signaling link.

As the conversation commences the originating Internet Module 72 is receiving from the originating central office 50 over the trunk connection digitized speech in DS0 format. The Internet Module implements the function of a packet assembler and disassembler or PAD and assembles packets in TCP/IP format. The packets bear the source and destination IP addresses and the digitized speech payload. The packets are dispatched from the originating router 85 onto the Internet and are delivered to the destination router and Internet Module 74. The receiving router and associated processor have the directory number of the called party and the matching IP address which were obtained via CCIS signaling from the originating router. The destination router and its processor interface perform the inverse function of the originating router and make the necessary translation of the TCP/IP packets to DS0 format which is delivered over the destination trunk to the destination central office. The switching system in that office converts the DS0 to analog and delivers the analog speech signal over the destination local loop to the destination telephone station 58. The responsive speech signal from the destination telephone station is processed in inverse fashion by the destination central office switching system and destination Internet Module and delivered to the Internet in TCP/IP format. The originating Internet Module and central office switching system also act in inverse fashion to deliver to the originating telephone station an analog voice signal.

Upon the establishment of the line/trunk connection to the Internet Module the originating central office may send billing information to the switch journal which indicates that an Internet call has been initiated and that may be recorded in the conventional manner.

Figure 4:
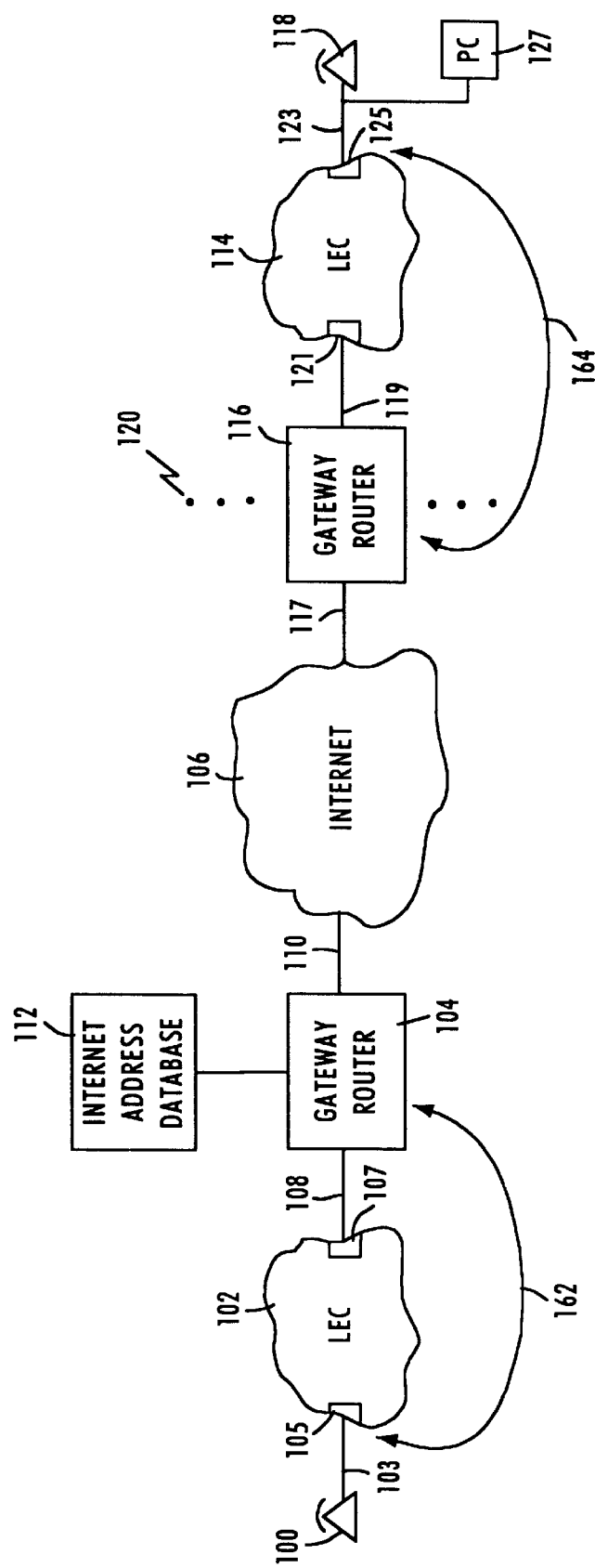
FIG. 4 shows in block diagram form the functional architecture of one embodiment of the present invention for providing telephone service via the Internet.

Referring to FIG. 4 there is shown a high level block diagram illustration of the architecture of one preferred embodiment of a system for implementing the present invention. A telephone 100 is connected to a Local Exchange Carrier (LEC) 102 by a conventional local loop 103 which normally would consist of a twisted pair to an end office 105. The Local Exchange Carrier or Telco may be either a Bell Operating Company (BOC) or an independent (e.g., GTE) which provide local transmission services. In order to provide telephone services according to the invention the LEC 102 is connected to a gateway router 104 which in turn is connected to the Internet 106. The gateway router 104 may be regarded as an ISP's gateway mechanism. The ISP may or may not be a part of the LEC. In a broad sense the gateway router 104 is equivalent to the router 85–87 shown in FIG. 3. The router 104 is connected to an end office switch 107 which is the exit from the LEC cloud 102. The connection between the router and end office switch may be a T1 trunk 108. The gateway router 104 is connected to the Internet cloud 106 by a T1/T3 trunk 110.

According to the invention the gateway router 104 is connected to an Internet address database indicated at 112. This database provides a limited form of telephone number to Internet address translation as will presently be described in further detail. While the database is shown as unitary at 112 it is to be understood that a hierarchical distributed database may be utilized in the manner described with respect to the DNS servers as described in connection with FIGS. 6 and 7. Alternatively the database may constitute a part of another database such as the storage provided in an ISCP or Intelligent Peripheral (IP).

FIG. 4 shows a second LEC 114 connected to the other side of the Internet 106 via a gateway router 116. These connections may be made via a T1/T3 trunk 117, T1 trunk 119, and end office 121. The LEC 114 serves subscriber telephones indicated by the illustrative telephone station 118 connected by local loop 123 to end office 125. While only a single gateway router 116 and LEC 114 are illustrated in FIG. 4 it will be understood that the LEC 114 is representative of a large number of LECs which connect to the Internet via ISP gateways throughout the United States and world. These gateways and LECs are indicated by the black dots 120.

The operation of the system illustrated in FIG. 4 may be briefly described as follows. A caller at the telephone 100 desiring to make an Internet telephone call may go off hook and dial *82. As explained in connection with the system illustrated in FIG. 2, this prefix has been established by the LEC offering the service as a predesignated prefix or unique identifier with which the public may initiate an Internet telephone call. Other unique identifiers such as off-hook or other triggers, PIN numbers or the like may also be used. The dialing of the prefix *82 is followed by the dialing of the directory number of the called party, i.e., the telephone station 118. The end office switching system 105 connected to the calling telephone 100 within the LEC 102 analyzes the received digits and determines from the prefix *82 that the call is an Internet call. Responsive to its programming it connects the call to the gateway router 104 identified as an Internet telephone call, and it sends the dialed digits constituting the telephone directory number of the called station 118 to the gateway 104. The gateway router 104 queries the Internet address database 112 for the Internet address of the destination gateway router, which in this case is the gateway router 116 serving the LEC 114 to which the destination or called telephone 118 is connected.

At this point it is desirable to review Internet addressing in connection with the system and method of the instant invention. Internet addresses (IP addresses) are unique 32 bit numbers (12 digits) assigned by the Internet network information center (InterNIC). Globally unique addresses permit IP networks anywhere in the world to communicate with each other. As previously explained, IP addresses consist of four groups of decimal numbers with values between 0 and 255. IP addresses are read from left to right, with the digits on the left normally defining a network class and address, and the digits on the right defining a machine address on that network.

According to the invention, the Internet address database 112 reads the area code and NXX number of the dialed digits and extracts from its tables the IP address of the gateway router 116, which serves the called area and exchange via LEC 114. This IP address is delivered to the gateway router 104. The router uses the address to dispatch across the Internet 106 a TCP/IP packet which bears that IP address and which also includes the complete set of dialed telephone number digits identifying the called telephone station 118.

Figure 5:
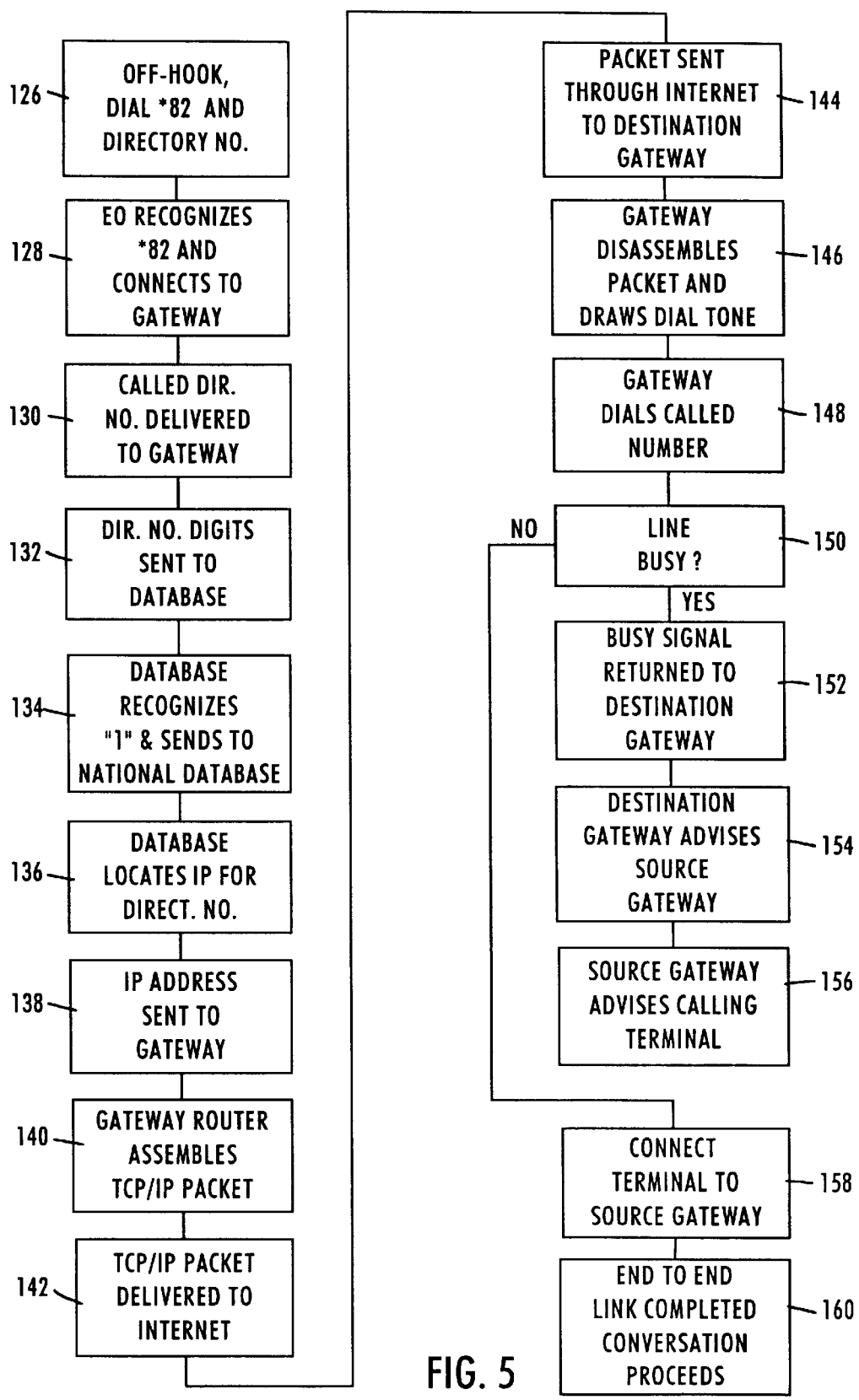
FIG. 5 shows in flow diagram form one mode of operation of the system of the invention.

The destination gateway router 116 in turn delivers the information in that packet to the LEC 114. Since the information includes the complete telephone number of the telephone station 118, the LEC 114 is in command of all necessary data to connect to that station. This methodology permits the establishment of the call without requiring communication between the LECs 102 and 114 other than through the Internet, and without requiring the maintenance of a full global IP address database on the source end at 112. The operation of the system is now described in further detail in connection with the flow diagram presented in FIG. 5.

At 126 the telephone 100 goes off hook, receives dial tone from end office 105, and dials the Internet call prefix *82 followed by the telephone number of the called station. In this example, it will be assumed that the dialed telephone number is 1-415-555-1212. At 128 the end office switch 105 recognizes the prefix *82 as the Internet call prefix and may connect the call through end office 107 to the gateway router 104. The telephone number digits 1-415-555-1212 are delivered to the gateway router. This is indicated at 130. At 132 the gateway router forwards the digits 1-415-555 to the Internet address database 112. At 134 the database recognizes the national long distance prefix 1 and directs the database inquiry to that section containing national area codes and exchange numbers. If an international prefix or access code were to be used the search would be directed to the appropriate section of the database for international numbers. As previously stated, the database 112 may comprise a single database or preferably a distributed database in the manner of the well-known DNS database system.

At 136 the database conducts its search, locates the corresponding IP address. At 138 the IP address is delivered to the gateway router 104. As previously explained and with respect to the system illustrated in FIGS. 5 and 6, the router possesses processing and PAD capabilities. The functionality of gateway routers in handling TCP/IP routing is described by Bennett, "Designing TCP/IP Internetworks", Chapter 11 Van Nostrand Reinhold, 1995. At 140 the router 104 assembles a TCP/IP packet which includes the IP address received from the database 112 as well as the complete directory number 415-555-1212 for the telephone station 118, in addition to other data.

At 142 this packet is delivered to the Internet 106. At 144 the packet is routed through the Internet which uses the Internet address obtained from database 112 to deliver the packet to the addressed gateway router 116. At 146 the destination gateway router 116 disassembles the TCP/IP packet and draws dial tone from terminating end office 121 in LEC 114. At 148 the gateway router 116 dials the number 415-555-1212. At 150 the LEC 114 determines whether the local loop 123 and telephone 118 corresponding to that number are busy. If the line is busy a busy signal is returned to the gateway router 116 at 152. At 154 the gateway router receives that information, assembles an appropriate TCP/IP packet and dispatches the packet through the Internet addressed to the origination or source gateway router 104. At 156 the gateway router 104 disassembles that packet and sends an appropriate signal to the calling end office 105 and calling telephone 100.

If the called line 123 is not busy, a connection is established to that line through the LEC 114 to gateway router 116. This is indicated at 158. The end-to-end Internet telephone circuit or virtual circuit is now established and the conversation proceeds at 160.

The operation just described involves connecting both the source or calling gateway router 104 and the destination or called gateway router 116 to make the initial determination as to whether or not the called line is busy. As an alternative to this procedure, the gateway routers may be provided with SSP capabilities, as described in connection with FIGS. 2 and 3. In this case common channel signaling may be used at the originating end to defer connecting the source or calling gateway router 104 to the subscriber line 103 until such time as the availability of the called party is established. This feature is indicated diagrammatically in FIG. 4 at 162. Likewise, on the destination end a connection from gateway router 116 to line 123 may be deferred via common channel signaling until the availability of the line is established. This is indicated diagrammatically at 164. In either mode of operation when an originating trunk is assigned the billing may be implemented by the journal at the originating end office 105, which reads the trunk number and provides the conventional billing information to the revenue accounting office (RAO). The billing may be done either at a flat rate or on a timed basis. It will be obvious that the common channel signaling approach indicated at 162 and 164 is preferable for billing purposes as well as to minimize unnecessary equipment usage.

Figure 6:
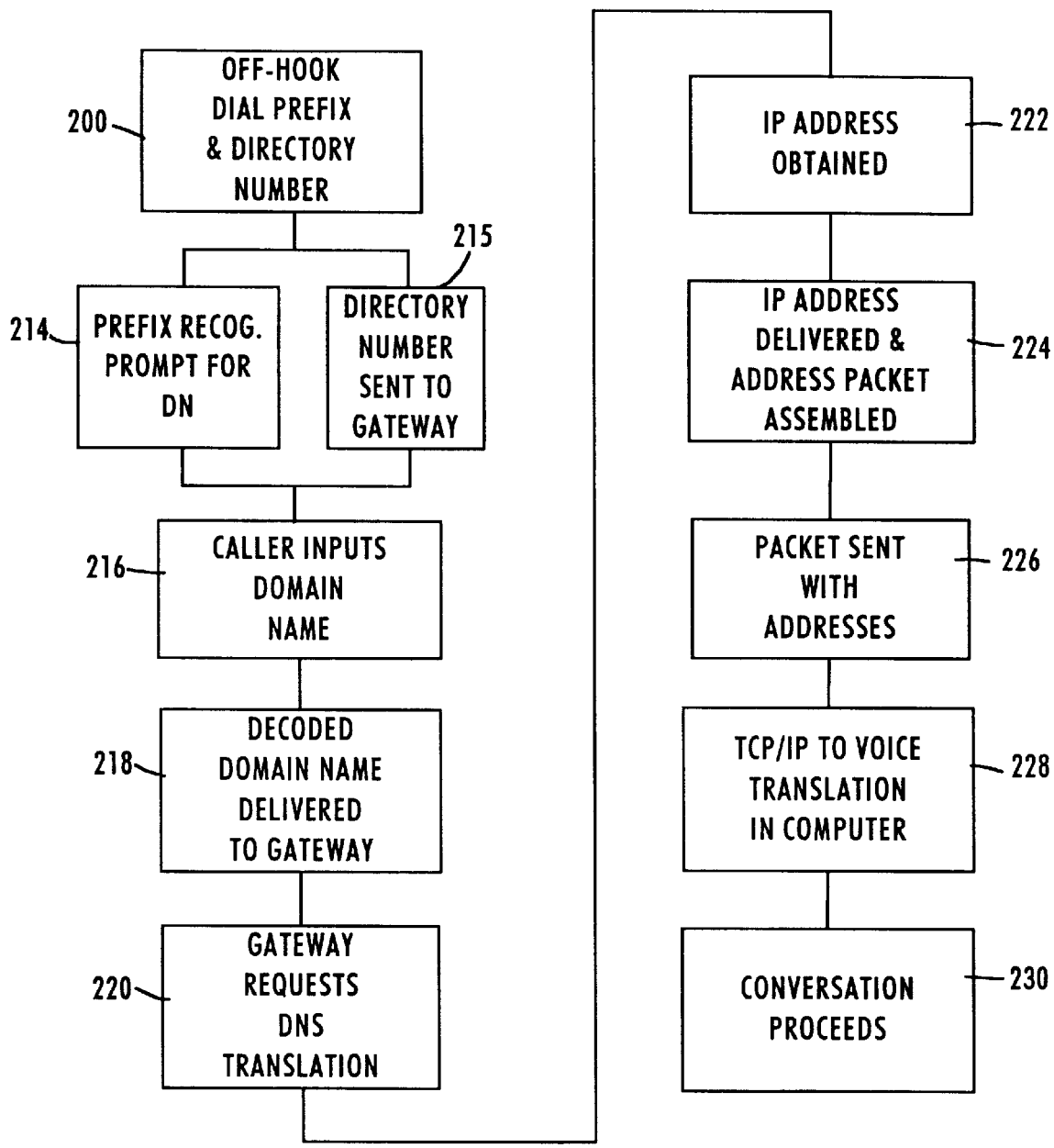
FIG. 6 shows in flow diagram form another mode of operation of the system of the invention.

Another mode of operation of the basic system of FIG. 4 is now described in relation to the simplified flow diagram of FIG. 6. This mode of operation is adapted to the situation where the called party has a customer premises equipment computer with voice capabilities and has an Internet domain or host name address. Such a computer is shown on 127 in FIG. 4.

Figure 7:
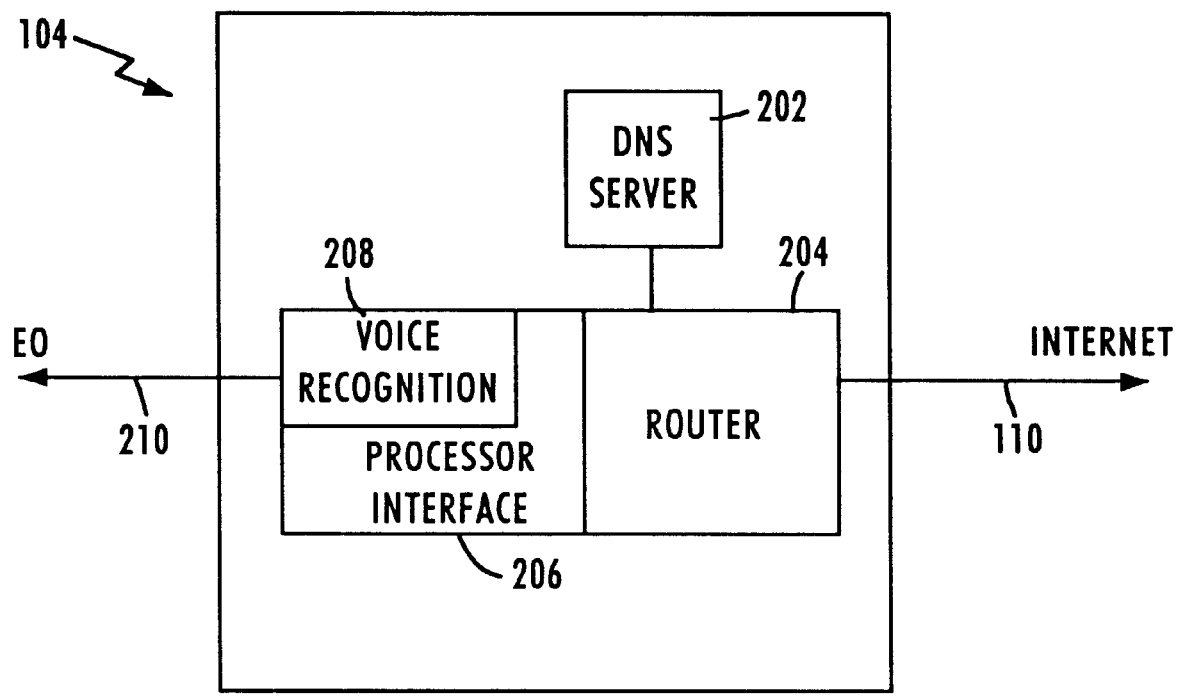
FIG. 7 shows in diagrammatic form the functional architecture of one embodiment of a gateway router module for use in operation of the system of the invention as described in connection with the flow chart of FIG. 6.

As previously explained, the Telco offering the telephone service of the invention has established a prefix *82 for a telephone-to-telephone Internet call. According to the present embodiment, the Telco also establishes a second prefix *83 for voice communication from a telephone to a voice capable computer possessing an Internet address. Communication establishment is here commenced by the calling party at telephone station 100 going off hook and dialing the prefix *83, as indicated at 200 in FIG. 6. According to this embodiment of the invention the gateway router 104 is supplemented as shown in FIG. 7. As shown in that figure a Domain Name Service (DNS) server 202 is provided for the router 204. The router 204 is also provided with a processor interface 206 such as described in connection with FIG. 2. The processor interface in turn includes a voice recognition card 208. The processor interface is connected to the end office 107 at 210 and the router is connected to the Internet link 110.

Referring to FIGS. 4 and 7, the calling party at telephone 100 is connected to the gateway router shown in FIG. 7. As previously explained, this connection may be made responsive to the off hook and dialing of the prefix *83. In the alternative the connection may be made following CCIS signaling to establish the availability of the called line as indicated at 162 and 164 in FIG. 4.

As indicated at 214 in FIG. 6, the originating end office 105, having recognized the prefix *83 as requesting a telephone-to-computer voice communication issues a voice prompt to the calling party requesting the party to spell out the domain or host name of the called party. Simultaneously the originating end office alerts the gateway router that a domain or host name call has been initiated and sends the directory number of the calling party. This parallel step is indicated at 215. At 216 the caller responds to the voice prompt and sends the spoken domain name to the voice card. At 218 the digitized domain or host name address signal is delivered by the voice card and processor interface to the router 204.

At 220 the router requests a domain name translation from the DNS server 202. The DNS server provides the translation from the domain or host name supplied by the caller into a complete IP address at 222. Since each site maintains its own domain name server, no single site on the Internet is in possession of all of the translation data. The overall data constitutes a distributed database and relies on the servers at the individual sites. Access to the DNS is through a resolver and software library functions. The function in this case takes a domain name or host name and returns an IP address. The functionality also is capable of providing the inverse function of taking an IP address and returning a host name. Referring to FIG. 6 the full IP address is returned at 224.

The router and its processor interface assemble a TCP/IP packet containing the complete IP address of the called PC 127, the IP address of the source gateway router 104, and the directory number of the calling party, in addition to other information. At 226 this packet is dispatched through the Internet to the destination gateway router 116.

An alternative to the foregoing procedure may be implemented without the caller having knowledge of the computer address. However, this requires an Internet address database enlarged to include telephone number to complete IP address translations. This is to be contrasted to the smaller telephone number to IP address database wherein the IP address extends only to the address of the destination gateway routers as previously described. The enlarged database is necessarily distributed in the manner of the domain or host name servers described above.

In the example illustrated in FIG. 6 it has been assumed that the availability of the called party has been established and that the destination computer 127 is connected through the LEC to the destination gateway router 116. Since the destination computer is voice capable the destination gateway router 116 may deliver the TCP/IP protocol signal direct to the computer. The translation from TCP/IP to analog voice then occurs as a function of the voice card in the computer. This is shown in FIG. 6 at 228. The telephone-to-telephone, or computer speaker and microphone, has been completed and conversation back and forth may proceed between the telephone 100 and voice capable computer 127. This is indicated in FIG. 6 at 230.

While the computer 127 has been assumed to be "on" in the foregoing example, its availability may also be established by indicating an incoming computer telephone call using a distinctive ring signal. The called party hearing the ring signal is thereby alerted that the incoming call should be answered via the computer. In an analogous manner the computer may be placed in an on-line condition through a wake up signal in the form of signaling between ringing signals in a known manner. In a still further alternative, the incoming TCP/IP signal need not be converted to voice but may be presented as text in the manner of an E-mail presentation. Such a presentation may be viewed in real time or may be stored for viewing at the convenience of the called party.

Figure 8:
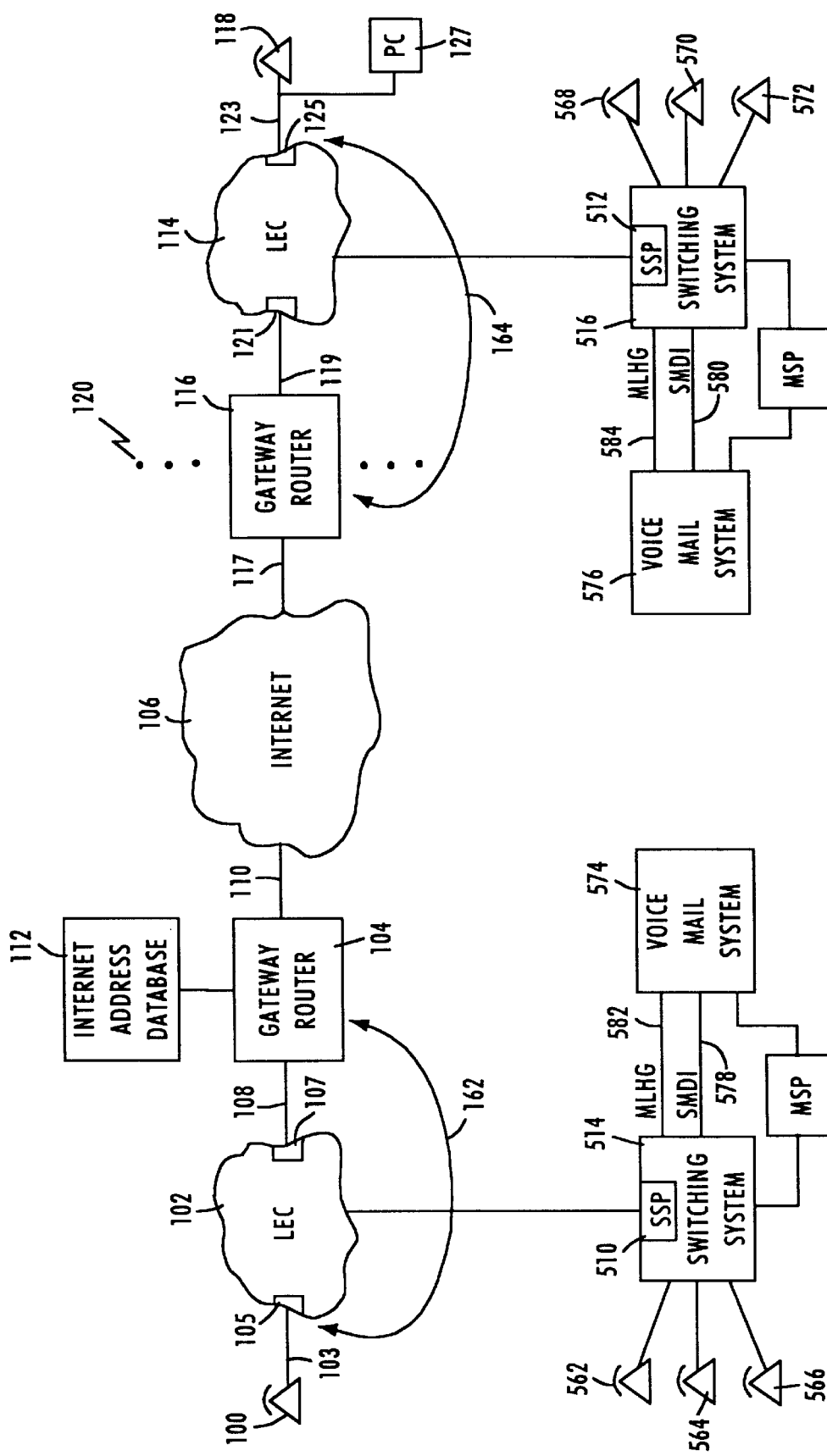
FIG. 8 shows a diagrammatic illustration of an architecture for providing voice mail service according to one embodiment of the invention.

The invention also comprehends and includes a mailbox type functionality where the retrieval as voice or text is at the option of the called party. The message may be deposited in the mailbox of the called party either as a result of a busy signal in an attempted telephone connection or an intentional deposit of a voice message without a desire to institute a real time voice connection. FIG. 8 provides a diagrammatic illustration of an architecture for providing this type of communication.

Figure 9:
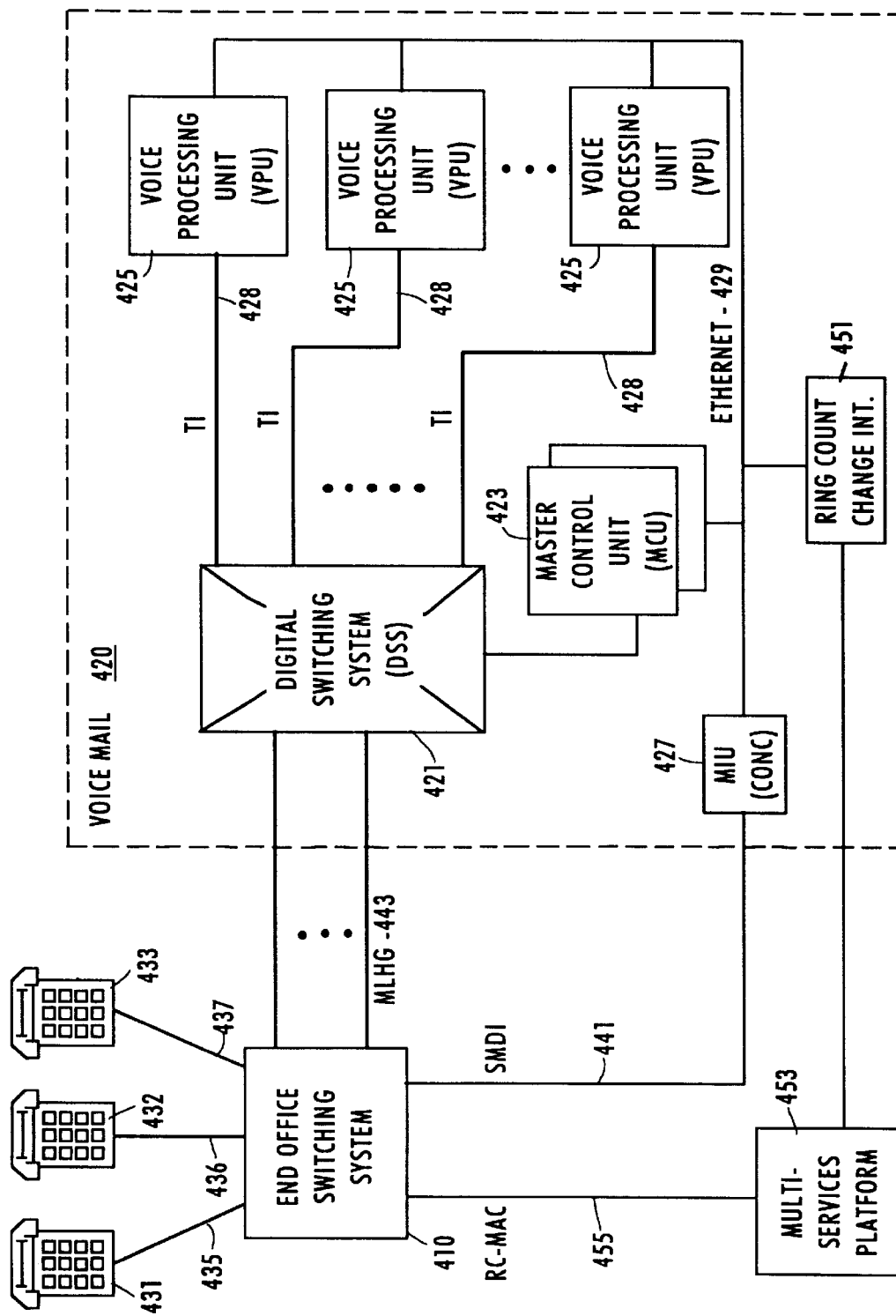
FIG. 9 shows a voice mail implementing communication system which may be used in the embodiment of the invention shown in FIG. 8.

FIG. 9 illustrates additional details of a voice mail implementing communication system which includes at least one switching system 410 and at least one centralized message service voice mail system 420. The switching system 410 may be a local or "end office" (EO) type telephone central office switch, such as a 1AESS or 5ESS switch sold by American Telephone and Telegraph.

The end office switching system 410 typically includes, among other components, a space or time division switching matrix, a central processing unit, an input/output device and one or more data communication units. A typical switch is described in further detail hereinafter in relation to FIG. 10. Structurally, the switching system 410 is a standard central office telephone switch. Each subscriber has at least one piece of customer premises equipment, illustrated as telephone station sets 431 to 433. Local telephone lines or loops 435 to 437 serve as communication links between each of the telephone station sets 431 to 433 and the end office switching system 410. Although shown as telephones in FIG. 9, the subscriber station equipment can comprise any communication device compatible with the line. Where the line is a standard voice grade telephone line, for example, the subscriber station equipment could include facsimile devices, modems, computers, etc.

The centralized message service or voice mail system in the illustrated example comprises voice messaging equipment such as a voice mail system 420. Although referred to as "voice" messaging equipment, equipment 420 may have the capability of storing messages of a variety of different types as well as voice messages. For example, a single system 420 may receive incoming messages in the form of audible messages, such as voice messages, as well as text format data messages. The voice messaging equipment 420 may also store messages in an image data format, such as facsimile. Message service systems having the capability to store messages in a variety of audible, data and image formats are known, see e.g., U.S. Pat. No. 5,193,110 to Jones et al., U.S. Pat. No. 5,008,926 to Misholi and U.S. Pat. No. 4,652,700 to Matthews et al.

The illustrated voice mail system 420 includes a digital switching system (DSS) 121, a master control unit (MCU) 423, a number of voice processing units (VPUs) 425 and a master interface unit (MIU) or concentrator 427. The master control unit (MCU) 423 of the voice mail system 420 is a personal computer type device programmed to control overall operations of the system 420.

Each of the voice processing units 425 also is a personal computer type device. The voice processing units 425 each include or connect to one or more digital mass storage type memory units (not shown) in which the actual messages are stored. The mass storage units, for example, may comprise magnetic disc type memory devices. Although not specifically illustrated in the drawing, the voice processing units 425 also include appropriate circuitry to transmit and receive audio signals via T1 type digital audio lines. To adapt the system 420 to receive information other than voice and/or offer services other than voice mail, one or more of VPUs 425 might be reprogrammed to run other types of applications and/or process other types of incoming information. For example, one such unit might process facsimile information, one might process E-mail, etc.

An ETHERNET type digital network 429 carries data signals between the MCU 423 and the voice processing units 425. The Ethernet network 429 also carries stored messages, in digital data form, between the various voice processing units 425. The system 420 further includes T1 type digitized audio links 428 between the DSS switch 421 and each of the voice processing units 425.

The voice mail system 420 connects to the switching system 410 via a number of simplified message desk interface (SMDI) type data lines 441. Specifically, these SMDI links 441 connect between one or more data units (not shown) in the end office switching system 410 and the MIU 427 in system 420. Each SMDI line 441 carries 2400 baud RS-232 data signals in both directions between the voice mail system 420 and the switching system 410. The MIU 427 is a data concentrator which effectively provides a single connection of as many as 32 SMDI lines into the MCU 423 of the voice mail system.

The voice mail system 420 also connects to the end office switching system 410 via a number of voice lines 443 which form a multi-line hunt group (MLHG) between the switch matrix within the switching system 410 and the DSS switch 421 of the voice mail system 420. Typically, the MLHG lines 443 consist of a number of T1 type trunk circuits which each carry 24 voice channels in digital time division multiplexed format.

The above described voice mail system architecture is similar to existing voice mail type central messaging systems, such as disclosed in U.S. Pat. No. 5,029,199 to Jones et al., although other messaging system architectures such as disclosed in the other patents cited above could be used.

For purposes of the present embodiment, the voice mail system 420, or other centralized messaging system, will further comprise a ring count change interface 451. The interface 451 connects to the Ethernet network 429 and provides two-way data communication between the network 429 in the voice mail system 420 and a multi-services platform (MSP) 453. For example, the unit 451 might provide a 9600 baud data channel over a line to the platform 453.

The interface 453 will receive packets of data over the Ethernet network 429 indicating changes in the status of the various subscribers' mailboxes. These packets of data will identify a particular subscriber and indicate the number a number of rings for future use in processing calls for that subscriber. The interface 453 forwards the ring count change data packets to the platform 453. The interface also receives data signals from the MSP 453, for example acknowledgements of transmitted data and/or signals indicating actual changes of status information by the switching system 410. In enhanced embodiments, the interface might include some data processing capabilities, as well. Also, the interface can provide instructions to change some other parameter of the call forwarding procedure, such as the subscriber's forwarding number.

The multi-services platform 453 connects to the end office switching system 410 via a recent change-memory administration channel (RC-MAC) 455. RC-MAC 455 is a data link to the processor of the switching system 410 for inputting data into the translation tables used by the switching system 410 to control switched communications operations with regard to each subscriber's line. The multi-services platform is a processor for receiving various service change instructions, including those from the interface 451 and from other sources, processing the instructions as necessary to make them compatible with switch programming, and forwarding instructions to the switching system 410 to change specific relevant translation table data stored in the switching system. In response to the change of status data from the ring count interface 451, the multi-services platform 453 provides appropriate data packet signals on the RC-MAC channel 455 to the end office switching system 110 to change a particular subscriber's ring count for forwarding on no answer. The instructions from the MSP 153 will identify a specific subscriber's line and will specify a ring count or ringing interval for use in determining when a call for that subscriber has gone unanswered and should be forwarded to the voice mail system 420. The multi-services platform may also forward instructions to change other parameters of the call forwarding function.

Operation via an RC-MAC channel to change data in a switching system relating to call forwarding is described in U.S. Pat. No. 5,012,511 to Hanle et al., the disclosure of which is incorporated herein in its entirety by reference. The multi-services platform 453 is the same as or substantially similar to a processor used in the patented system to process various translation memory change requests, both from RC-MAC terminals and a voice response unit.

Figure 10:
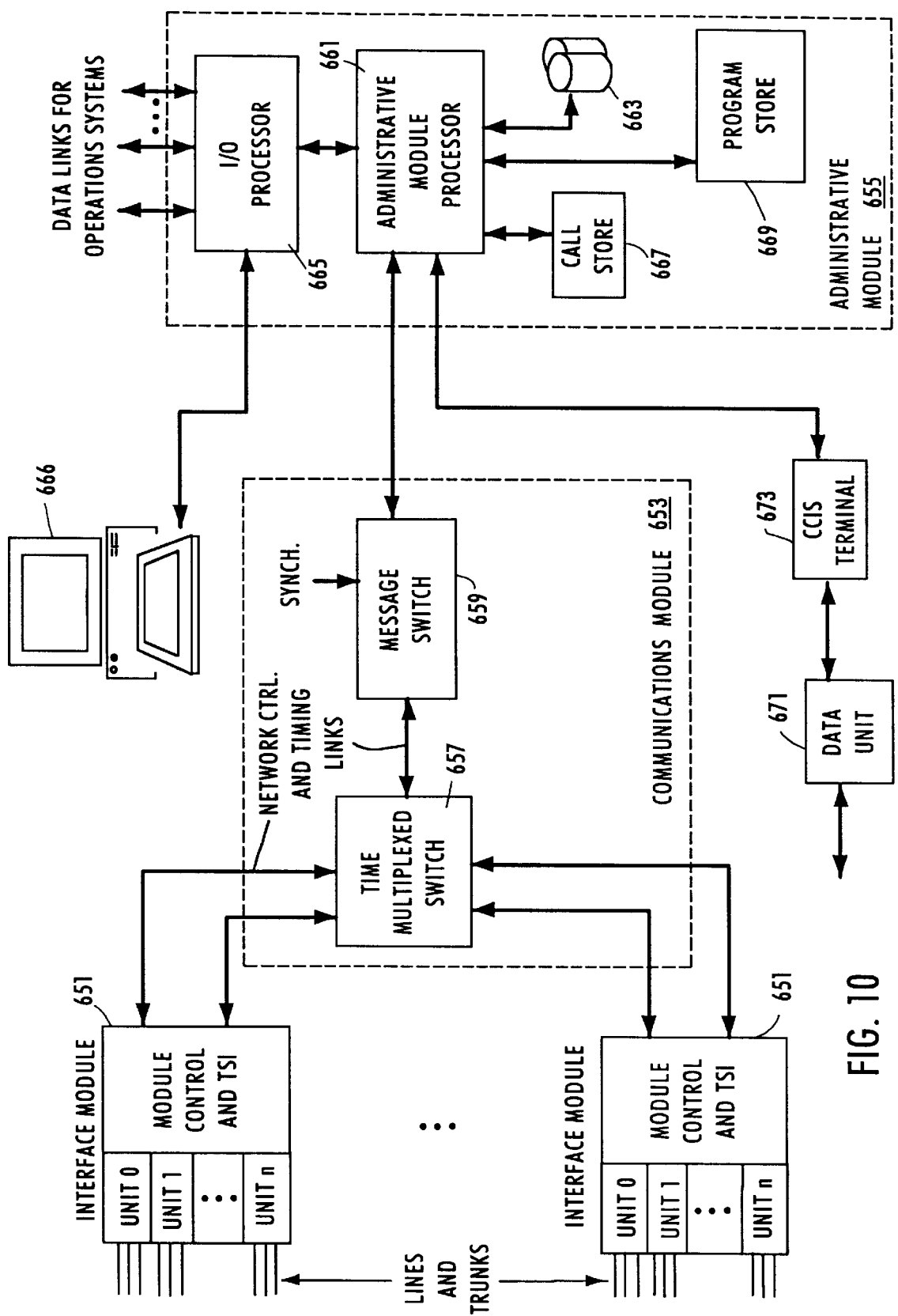
FIG. 10 shows a typical program controlled switch which may be used in the networks of the invention.

FIG. 10 is a simplified block diagram of an electronic program controlled switch which may be used as any one of the SSP type switching offices in the systems of FIG. 4 or 8. As illustrated, the switch includes a number of different types of modules. In particular, the illustrated switch includes interface modules 651 (only two of which are shown), a communications module 653 and an administrative module 655.

The interface modules 651 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. The interface modules for the analog lines also include dial pulse detectors and dual tone multifrequency (DTMF) detectors. Alternatively, the lines or trunks may use digital protocols such as T1 or ISDN. Each interface module 651 also includes a digital service unit (not shown) which is used to generate call progress tones.

Each interface module 651 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 657 and thence to another interface module (intermodule call connection).

The communication module 653 includes the time multiplexed switch 657 and a message switch 659. The time multiplexed switch 657 provides time division transfer of digital voice data packets between voice channels of the interface modules 651 and transfers data messages between the interface modules. The message switch 659 interfaces the administrative module 655 to the time multiplexed switch 657, so as to provide a route through the time multiplexed switch permitting two-way transfer of control related messages between the interface modules 651 and the administrative module 655. In addition, the message switch 659 terminates special data links, for example a link for receiving a synchronization carrier used to maintain digital synchronism.

The administrative module 655 includes an administrative module processor 661, which is a computer equipped with disc storage 663, for overall control of operations of the switching office. The administrative module processor 661 communicates with the interface modules 651 through the communication module 653. The administrative module 655 also includes one or more input/output (I/O) processors 665 providing interfaces to terminal devices for technicians such as shown at 666 in the drawing and data links to operations systems for traffic, billing, maintenance data, etc. A CCIS terminal 673 and an associated data unit 671 provide a signaling link between the administrative module processor 661 and an STP of the SS7 signaling network, for facilitating call processing signal communications with other central offices (COs) and with one or more of the SCPs and/or the ISCP.

As illustrated in FIG. 10, the administrative module 655 also includes a call store 667 and a program store 669. Although shown as separate elements for convenience, these are typically implemented as memory elements within the computer serving as the administrative module processor 661. For each call in progress, the call store 667 stores translation information retrieved from disc storage 663 together with routing information and any temporary information needed for processing the call. For example, for a switch based Centrex type service, the call store 667 would receive and store extension number translation information for the business customer corresponding to an off-hook line initiating a call. The program store 669 stores program instructions which direct operations of the computer serving as the administrative module processor.

Of particular note, the translation data in the disc storage 663 includes translation information needed to address messages for transmission through the signaling network. In particular, when the switch needs to send a message through the SS7 network to a particular node, the data from the disc storage 663 provides the global title and/or point code for the message destination.

Referring to FIG. 8 there is shown a diagram of another version of the Internet telephone communication network illustrated and described in connection with FIG. 4. The network in FIG. 8 includes a voice mail system associated with each of the LECs 102 and 114 and their end office switching systems 105 and 125. FIG. 8 shows two SSPs 510 and 512 which comprise end office switching systems 514 and 516 in the LECs 102 and 114 respectively. The end office 514 represents an end office in the LEC 102 and the end office 516 represents an end office in the LEC 114.

Each switching system 514 and 516 in this illustration comprises an end office and is connected to customer premises equipment, illustrated as telephone stations 562, 564, 566, 568, 570 and 572. Local telephone lines or local loops serve as communication links between each of the telephone stations and its end office switching system. It will be understood that the subscriber station equipment may also comprise other communication devices compatible with the line, such as facsimile devices, modems, computers, etc.

Each switching system 514 and 516 is also provided with a centralized message service or voice mail system shown in FIG. 8 as 574 and 576. These systems may be of the type illustrated and described in detail in connection with FIG. 9. Although referred to as voice messaging equipment, the systems 574 and 576 may have the capability of storing messages of a variety of different types as well as voice messages. For example, a single system may receive incoming messages in the form of audible messages such as voice messages, as well as text format data messages. The equipment may also store messages in an image data format such as facsimile.

The voice mail systems 574 and 576 connect to the switching systems 514 and 516 via SMDI data lines 578 and 580 and by multi-line hunt groups (MLHGs) 582 and 584. Typically, the MLHG lines consist of a number of T1 type trunk circuits which each carry 24 voice channels in digital time division multiplexed format.

The operation of the system shown in FIG. 8 according to one mode of the invention may be as follows:

A subscriber associated with telephone station 562 desiring to use the Internet to leave a voice message in the mailbox of a remote subscriber, such as the subscriber associated with telephone station 568, may use a telephone station to access his own voice mailbox in the voice mail system 574. This may be accomplished by dialing a number associated with the voice mail system 574 for this purpose. The desire to use the mailbox for an Internet communication may be signalled either by use of a unique prefix, as *84, or may be encoded into the number to be dialed to reach the mailbox for Internet communication purposes.

The voice processing unit of the voice mail system may operate its voice menu to direct the caller to depress a specified key when satisfied with the message in a known fashion. It may then query the caller as to whether he desired to send the message and, if so, to depress another specified key. The voice unit then will instruct the caller as to the procedure for keying in the telephone number identity of the destination and to depress a further specified key to send the message. The message is digitized in conventional fashion and stored in the mailbox of the sender. The caller may go on-hook after depressing the designated send key. The depression of the send key causes the generation of a tone or signal which is recognized by the SSP 510 as a trigger.

In response to the trigger, the SSP frames a TCAP inquiry message which is directed via one or more STP's to an ISCP for instructions. The TCAP message includes information identifying the calling station and mailbox and the called station and the fact that the caller is requesting mailbox-to-mailbox message transfer via the Internet. The ISCP consults its database to establish the existence and identity of a mailbox for the called number. If the identity of such a mailbox is found the ISCP then originates a response to the SSP 510. This response includes instructions to packetize and dispatch the instructions to the SSP associated with the end office switch 107 which is connected to the gateway router 104. The instructions comprise one or more SS7 packets containing, among other signals, the called directory number and mailbox identity with an appropriate routing label and handling instructions, the digitized voice retrieved from the mailbox of the sender, and the identity of the originating mailbox and calling directory number. The information may be in T1 protocol which is conventionally the output digital signal of mailbox equipment used in the public switched telephone networks regardless of manufacture. Thus any translation which is necessary between the digitized message in the mailbox and the T1 or equivalent protocol used in the SS7 packets inherently occurs in the equipment furnished by the voice mail system manufacturer.

Upon receiving the foregoing SS7 message the Internet end office 107 establishes a connection to the gateway router 104. The gateway router in turn accesses the Internet address database 112 and obtains an Internet address for the destination gateway router 116 associated with the called telephone number and the voice mail system 576 which serves that telephone station in LEC 114. The destination gateway router thereupon establishes a link to the destination voice mail system and delivers the voice message.

The foregoing description of operation assumed that an address for the destination address could be secured at the sending end. However, if the existence and/or identity of a mailbox associated with the destination directory number is not subject to determination in the database of the sending end ISCP, the originating SSP 510 is instructed by its ISCP to include in the packet header appropriate directions to the remote destination SSP 512 to cause triggering and the formation and dispatch of a TCAP inquiry message to its associated ISCP. In such a case the destination ISCP conducts a dip of its database and provides the requested information to the SSP 512. The packet is thereupon processed through the SSP 512 and voice mail system 576 to digitally record the contents of the remotely originated information. Again the voice mail system is so designed as to inherently handle any translation necessary to communicate with the switching system in T1 or equivalent protocol.

When the packets reach the destination SSP 512 and the digitized voice message and accompanying instructions have been deposited in the mailbox of the addressee, the voice mail system 576 effects customary notification of the mailbox proprietor that a message is waiting. The proprietor may then access the mailbox in conventional fashion and have the message delivered as an audio voice message in the usual manner. The recipient then has the option of returning a message in a converse fashion by depressing the appropriate keys at his telephone station, which utilize the information in the packet header to reverse the origination and destination identifications. If the mailbox-to-mailbox communication feature is furnished by the involved telephone companies as an extra feature, it will be appreciated that either or both ISCPs may ascertain from their appropriate databases the authorization of the user to access the service.

As an alternative to the foregoing, instead of delivery of the message in response to action of the addressee, the message may be delivered in response to initiation by the LEC as part of a known message delivery service.

Because currently available ISCP's include billing modules they may also effect billing. The data may be sent out through the ISCP so that it can either be directed to the revenue accounting office on a direct line or it may send a TCAP message back into the SSP or end office switch to the originating number responsible for the origination of the call. Billing can be accomplished in any desired fashion, such as in bits per second, call set-up, number of packets, or any combination of the same. The billing information may go into the journal on the switch to be forwarded to the revenue accounting office.

According to another embodiment, the invention provides a system and method for transferring voice mail or messages to called parties who are not voice mail subscribers and thus do not possess individual or personal mailboxes. Pursuant to this embodiment of the invention, Voice Mail Systems 574 and 576 in the simplified network illustrated in FIG. 8 are provided with multiple unsubscribed mailboxes, which are here described as public mailboxes or mailboxes for temporary hire. It will be understood that such mailboxes may constitute mere addresses or addressable storage or memory in the voice mail system storage. Such mailboxes may be utilized according to a first embodiment of the invention in the following fashion.

A caller at telephone station 562 connected to central office 514 makes a call to a remote called party at station 570 at central office 516. In this case the common channel signaling system 520 determines that the call cannot be completed because of a busy or a no answer situation. The attempt to establish a voice connection between the two telephone stations is terminated and the caller is directed, as by voice prompt, to the voice mail system 574 associated with the originating central office 514. The voice processing unit associated with the voice mail system 574 informs the caller that the line is busy or that there is no answer and inquires as to whether or not the caller would like to leave a message. It also indicates that if the caller chooses to leave a message the charge will be, for example, twenty-five cents, which will be charged to his telephone bill. The Voice Processing Unit requests a yes or no response, either by voice or DTMF key or the equivalent. Where the response is affirmative, the caller is invited to leave the message in the conventional voice mail fashion and the message is stored in a public mailbox in the voice mail system 574. Appropriate messaging then occurs via the SMDI link 578 to effect billing to the caller.

Subsequent to termination of the deposit of the message as digitally stored data, the message is transferred via the Internet from the public mailbox in voice mail system 574 to a temporarily mating or corresponding public mailbox in voice mail system 576. Such transfer is effected through the Internet in the manner previously described. Following deposit or storage of the message in the destination voice mail system 576, that voice mail system initiates attempts to reach the called party or addressee at telephone station 570 to announce to that party that a message has been deposited for retrieval. The same announcement may include the instruction that the message may be retrieved by depression of a stated DTMF key. The actuation of the key may create a record constituting a receipt for the originating party. The digitally stored voice message is then delivered from the voice mail system 576 to the caller at station 570 as an audio voice message in the usual fashion. The notification of the receipt may be transferred to the billing record of the originating caller via the common channel signaling system and receipt noted with the billing for the delivery of the message.

As a still further feature of the invention, the original invitation to leave a message to the caller can include a further inquiry as to whether or not the caller requests a reply. The announcement may indicate that the delivery of the request and delivery of any reply would entail an additional charge of, for example, twenty-five cents. In the event that the caller requests a reply, the information which is transferred via the Internet pursuant to the invention includes an appropriate bit to indicate that a reply is requested. When the destination voice mail system delivers the message it responds to that bit by voicing a message that informs the recipient that a reply is requested. Instructions as to delivering a reply are provided to the called party or addressee by the destination voice mail system. The called party may then record the reply as digitized data in the local voice mail system 576.

Subsequent to termination of the connection between the destination voice mail system and the called party, the reply is transferred via the Internet back to the originating voice mail system 574 as previously described. The digitally stored reply is then delivered to the original calling party by a call from the voice mail system to the originating telephone station 564. The reply is also delivered as an audio voice message.

In the embodiment of the invention just described, the situation involved a busy or no answer condition. It is still another feature of the invention to offer the service of audio voice message delivery without an attempt to establish two-way telephone connection with the called party. Such a service may be set up using a real or virtual directory number to trigger the service. Dialing such number establishes a connection to a voice mail system local to the calling party having public or for hire mailboxes as previously described. This may be a public mailbox in the local voice mail system 574 in FIG. 8. The caller is invited to speak the message and the voice processing unit of the voice mail system may then operate its voice menu to direct the caller to depress a specified key when satisfied with the message in a known fashion. It may then query the caller as to the destination directory number. This may be followed by an inquiry to establish whether the caller requests a reply. Billing information is provided to the caller and suitable billing signaling is effected, as by use of the SMDI link 578 to the local voice mail system 574.

Following storage of the digitized voice message and digitized signaling regarding delivery and response, the digitized message is transferred via the Internet to a destination public mailbox in a voice messaging system designated by the destination ISCP on the basis of the directory number of the called party. This mailbox may be in the remote voice mail system 576 where the digitized message and instructions are stored. Delivery of the message is then effected in the same manner as previously described. Any reply is first stored in the public mailbox in voice mail system 576 and subsequently transferred through the Internet to the originating voice mailbox. The reply is then delivered to the original calling party by a telephone call to the originating telephone station.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A method of real-time interactive voice telecommunication over the Internet comprising the steps of:

initiating a telephone call by inputting to a first communication terminal connected to a first telephone system having a common channel interoffice signaling (CCIS) network a called directory number with a unique identifier said unique identifier indicative that the call is to be routed through the Internet;

receiving the information input in said initiating step at a switch in said first telephone system associated with said first communication terminal and, responsive to the unique identifier, translating the called directory number to an Internet address for an Internet to telephone system gateway capable of serving as a gateway between the Internet and a second telephone system serving said called directory number;

delivering to said second telephone system via said Internet and said gateway said called directory number;

establishing through said second telephone system a connection between said gateway and a second communication terminal identified by said directory number;

signaling the establishment of said connection between said gateway and said second communication terminal to said CCIS network in said first telephone system;

establishing through said first telephone system a connection between said first communication terminal and a second gateway between the Internet and said first telephone system whereby a communication link is established from said first communication terminal to said second communication terminal through said first telephone system, said Internet, and said second telephone system.

2. A method according to claim 1 wherein said link comprises a connected link through said first and second telephone systems and a connectionless virtual link through said Internet.

3. A method according to claim 2 wherein said link transports two way digitized voice signals which are inputted and outputted from said first and second communication terminals as analog sound.

4. A method of telecommunication over the Internet comprising the steps of:

inputting to a first communication terminal connected to a first telephone system having a common channel interoffice signaling (CCIS) network a called directory number and a unique identifier for placing a telephone call, said unique identifier indicative that the call is to be routed through the Internet;

responsive to the unique identifier, translating the called directory number to an Internet address for a first Internet to telephone system gateway capable of serving as a gateway between the Internet and a second telephone system serving said called directory number and having a common channel interoffice signaling (CCIS) network;

delivering to said CCIS network in said second telephone system said called directory number and determining if a second communication terminal identified by said directory number is available;

upon determining that said second communication terminal is not available, using said CCIS network in said second telephone system to deliver to said first gateway a signal indicating that said second communication terminal is not available;

responsive to said last named signal delivering through the Internet to a second gateway between said Internet and said first telephone system a signal indicating that said second communication terminal is not available;

establishing a connection between said first communication terminal and a first storage associated with said first telephone system;

storing a message for said second communication terminal in said first storage;

delivering said message from said first storage via said Internet to a second storage associated with said second telephone system; and delivering said message from said second storage to said second communication terminal by connecting said second storage to said second communication terminal through said second telephone system.

5. A method according to claim 4 wherein said step of delivery said message to said second communication terminal is initiated from said second communication terminal.

6. A method according to claim 4 wherein said step of delivery said message to said second communication terminal is initiated from said second telephone system.

7. In a wide area communications network comprising:

a first telecommunication network having trunked central office switching systems connected to subscriber lines connected to subscriber premises terminals and including signal switching points and at least one signal transfer point for selectively providing switched communications between said subscriber lines;

a second telecommunication network having trunked central office switching systems connected to subscriber lines connected to subscriber premises terminals for selectively providing switched communications between said subscriber lines;

a controller associated with said first telecommunication network and arranged separately from said central office switching systems in said network and being connected to at least said signal switching points connected to said central office switching systems through at least one signal transfer point arranged to convey control data to effect communications, said controller storing processing and routing data;

each said central office switching system in said first telecommunication network providing selective communications between subscriber lines and a first centralized message processing and storage system for handling multiple different types of message information;

said first and second telecommunication networks being connected through first and second gateway routers to the Internet;

said first gateway router connected to said first telecommunication network having a signal transfer point associated therewith and connected to said controller;

a method comprising:

ascertaining through said signal switching points and at least one signal transfer point in said first telecommunication network and through said gateway routers and said Internet the availability of a designated subscriber premises terminal in said second telecommunication network;

upon establishing the unavailability of said designated subscriber premises terminal through said Internet forwarding to said centralized message processing and storage system message information of a first type addressed to said designated subscriber premises terminal and storing said message information in said centralized message processing and storage system;

subsequently establishing a link between said centralized message processing and storage system through said gateway routers and said Internet to said designated subscriber premises terminal; and forwarding to said designated subscriber premises terminal through said gateway routers and said Internet said message information; wherein said ascertaining step includes the steps of identifying said designated subscriber premises terminal by telephone directory number, translating said directory number to the Internet address of said second gateway router, transmitting to said second gateway router through said Internet said directory number, using said directory number in said second telecommunications network to establish the availability of said designated subscriber premises terminal identified by said directory number, and signaling through said second gateway router to said first gateway router a response to said availability inquiry.

* * * * *